United States Patent [19]
Santoro

[11] 4,330,098
[45] May 18, 1982

[54] GEAR DRIVING MECHANISMS CHANGING THE LAST GEAR THEREOF UPON EACH REVERSAL OF THE DIRECTION OF THE MOTOR MEMBER

[76] Inventor: Giovanni Santoro, Via Campodimele 55, Roma, Italy

[21] Appl. No.: 135,337

[22] Filed: Mar. 31, 1980

[30] Foreign Application Priority Data

Apr. 3, 1979 [IT] Italy ............................... 48606 A/79

[51] Int. Cl.³ .......................... G03B 1/04; G11B 15/32
[52] U.S. Cl. ..................................................... 242/201
[58] Field of Search ................................ 242/200–204, 242/208; 352/78 R; 74/352–354, 355, 376, 377, 810, 812

[56] References Cited

U.S. PATENT DOCUMENTS

| | | | |
|---|---|---|---|
| 3,550,984 | 12/1970 | Moore | 242/201 X |
| 3,670,981 | 6/1972 | Cavella | 242/67.4 |
| 4,018,518 | 4/1977 | Wright | 352/78 R |
| 4,046,334 | 9/1977 | Kato | 242/201 |

FOREIGN PATENT DOCUMENTS

2440824  3/1976  Fed. Rep. of Germany ...... 242/201

*Primary Examiner*—Leonard D. Christian
*Attorney, Agent, or Firm*—DeLio and Montgomery

[57] ABSTRACT

A reversible gear driving mechanism for transmitting the movement of a motor member of the reversible type is disclosed having two last gears mounted on a swinging support adapted to swing from a first position, where the first one of the two last gears is in mesh with a first gear wheel utilizing the movement or first final gear wheel, into a second position where the second last gear is in mesh with a second gear wheel utilizing the movement or second final gear wheel. The driving member also including a shiftable or sliding control member adapted to take two stable positions and controlled in turn by the shift of the swinging support so as to take one or the other position according to the position taken by the latter.

6 Claims, 5 Drawing Figures

GEAR DRIVING MECHANISMS CHANGING THE LAST GEAR THEREOF UPON EACH REVERSAL OF THE DIRECTION OF THE MOTOR MEMBER

This invention refers to a driving mechanism automatically changing the last gear thereof upon each reversal of the direction of the motor member.

More particularly, the invention refers to a gear mechanism for transmitting the movement of a motor member of the reversible type associated thereto provided with two last gears mounted on a swinging support adapted to swing from a first position, where the first one of the two last gears is in mesh with a first gear wheel utilizing the movement or first final gear wheel, into a second position where the second last gear is in mesh with a second gear wheel utilizing the movement or second final gear wheel.

The driving member of the invention also comprises a shiftable or sliding control member adapted to take two stable positions and controlled in turn by the shift of the swinging support so as to take one or the other position according to the position taken by the latter.

The swinging support shifts into one of the two positions remaining therein until the motor member rotates in one direction and, upon reversal of the motor member it shifts automatically into the second position remaining therein until the motor member rotates in this other direction.

In the first angular position of the swinging support one of the last gears mounted thereon is in mesh with the first final gear wheel transmitting the movement of the motor member thereto according to one direction of rotation thereof, while in the second angular position the other last gear is in mesh with the second final gear wheel, transmitting the movement of the motor member thereto according to the opposite direction of rotation thereof.

It is evident that the field of application of the mechanism of the invention is quite wide since it can be used in any machines, from toys to machine tools wherein it is required to reverse at will the direction of rotation of any member changing the final gear wheel and a shiftable control member should be provided for transmitting the drive to any mechanical member upon each reversal of the motor member. However, the mechanism of the present invention is particularly adapted to cassette tape recorders provided also with reverse operation, wherein it is required both to reverse the direction of movement of the tape changing the final gear wheel and to control the movement of a mechanical member, such as the head switching relay, simultaneously therewith.

However, it is a main object of the invention to provide a gear mechanism adapted to transmit the movement of a motor member associated thereto to one of two different gear wheels utilizing that movement or final gear wheels through a pair of last gears of the mechanism, wherein the movement is transmitted in opposite directions to one or the other of the two final gear wheels, depending on the direction of rotation of the motor member, the last gears automatically changing their position upon each reversal of the direction of rotation of the motor member and these relying exclusively on such reversal.

It is a further object of the invention to provide such a mechanism comprising a control member shiftable from a first into a second position taken thereby depending on the direction of rotation of the motor member.

The invention will be now described in detail with reference to the annexed drawings, wherein.

It should be now understood that since the mechanism of the invention is a gear drive it can comprise any number of intermediate gear wheels.

However, the motor member, the primary gear wheel making part of the mechanism and the pair of last gears only are essential for the purposes of the invention.

In this description referring to a particular application of the mechanism, it will be evident that a single drive gear wheel is located between the motor member (not shown) and the primary gear wheel.

According to what stated above, the presence of this drive gear wheel is not essential and it is not a part of the invention.

Figure 1:
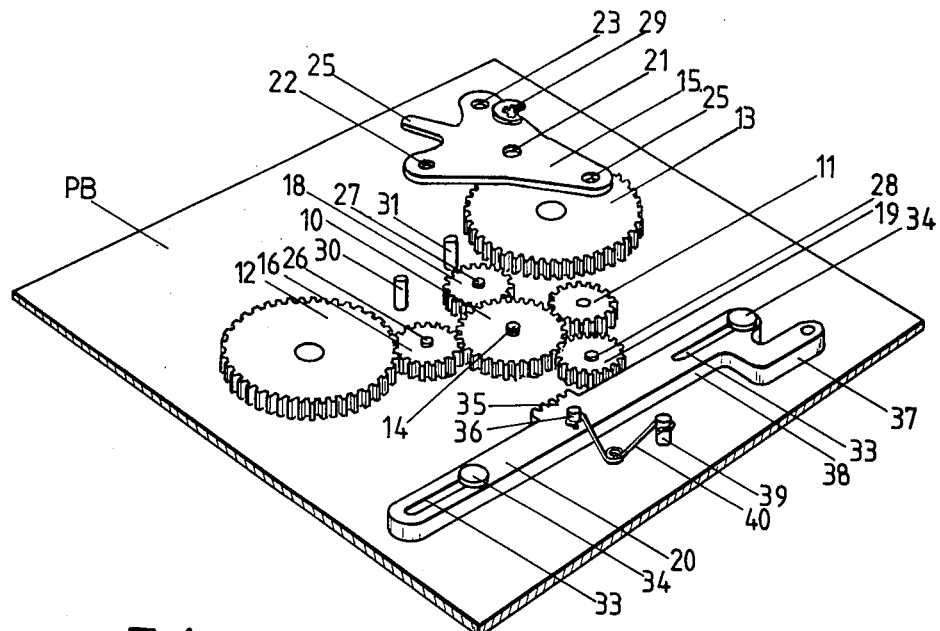
FIG. 1 is a partially exploded perspective view of the mechanism of the invention.

FIG. 1 is a perspective and partially exploded view of the mechanism of the invention adapted to transmit the movement of primary gear wheel 10 either to first final gear wheel 12 (FIG. 2) or to second final gear wheel 13 (FIG. 3), primary gear wheel 10 being driven by the motor member through drive gear wheel 11.

These gear wheels are all pivotally mounted on support plate PB and, particularly, primary gear wheel 10 can rotate freely about a shaft 14 integrally formed with bottom plate PB and protruding upwardly above primary gear wheel 10.

In the application of the mechanism to a cassette tape recorder provided with reverse operation, bottom plate PB is a wall integrally formed with the frame of the recorder, primary gear wheel 10 receives the drive of the motor member through gear wheel 11, which motor member is an electric motor of the reversible type, and gear wheels 12 and 13 are the gear wheels integrally formed with the shafts of the tape winding up and unwinding reels.

Furthermore, the driving mechanism comprises a supporting plate 15, two last gears 16 and 18, a rear gear 19 and a shiftable member 20.

Plate 15 has a central hole 21, a pair of front holes 22 and 23, a rear hole 24 and an extension on front arm 25. Plate 15 is mounted with its central hole 21 fitted onto the upper end of shaft 14 having primary gear wheel 10 pivotally mounted thereon, while shafts 26 and 27 of last gears 16 and 18 are received and riveted into the pair of front holes 22 and 23 and shaft 28 of rear gear 19 is received and riveted into rear hole 24.

Plate 15 is held on shaft 14 by an elastic stop 29 and, when assembled, front arm 25 thereof is located between blocking pins 30 and 31 integrally formed with bottom plate PB.

It should be understood that in the above-described mounted condition, plate 15 supporting gears 16 and 18, which are not meshed with each other, and gear 19 forms together therewith a unit referred to as a whole by reference number 32. Unit 32 is adapted to swing in respect of shaft 14 of primary gear wheel 10 which, in turn, is able to rotate freely in respect of plate 15, thus transmitting its movement to all the above-mentioned gears.

Shiftable control member 20 comprises a rod of rectangular cross section having an elongated slot 33 at each end in which a headed pin 34 is received, the pin being integrally formed with bottom plate PB.

Furthermore, rod 20 comprises a central rack section 35 directed towards swinging unit 32, a pin 36 protruding from its upper face and an arm 37 being integrally formed with its end 38.

Finally, a pin 39 protrudes from the upper face of bottom plate PB in adjacent relation to rod 20, one end of a bistable or snap-over spring 40 being anchored to pin 39 and the other end thereof being anchored to pin 36 integrally formed with rod 20.

From the foregoing it will be evident that with such an arrangement the shiftable control member comprising rod 20 is supported on bottom plate PB so as to reciprocate in respect thereto, this alternating movement being limited by the length of slots 33, rack section 35 being engageable with rear gear 19.

Figure 2:
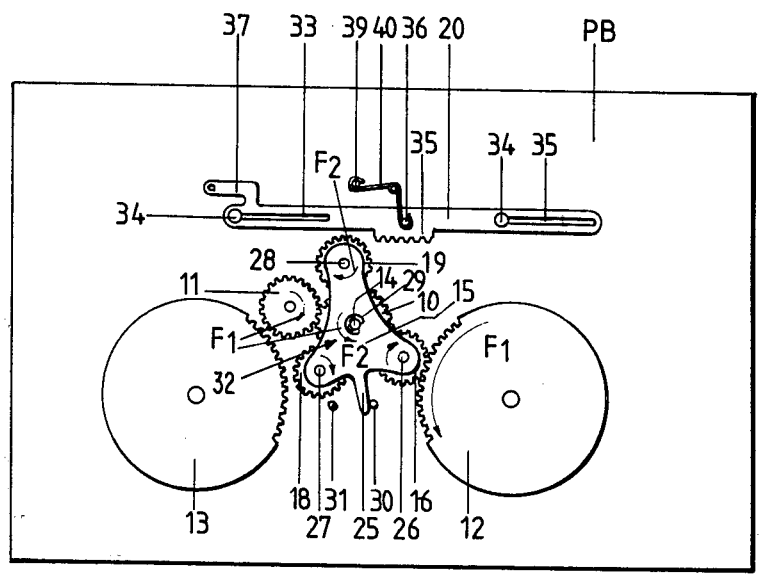
FIG. 2 is a plan view of the mechanism of FIG. 1 in one of the two stable positions of the swinging support and the shiftable member.
Figure 3:
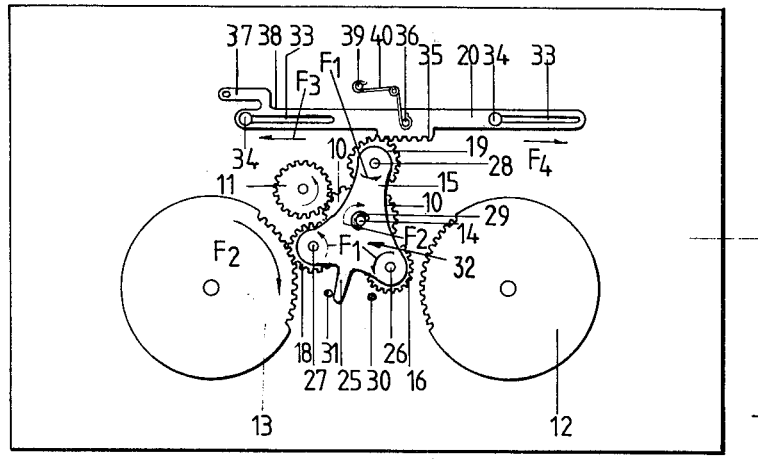
FIGS. 3 and 4 are views similar to FIG. 2 showing the mechanism in the other of the two stable positions before and after the shift of the control member, respectively; and, FIG. 5 is a similar view showing the mechanism during the shift thereof from the position of FIG. 2 into the position of FIG. 3.

In use, supposing that the motor member and, accordingly, the drive gear wheel rotate in the direction of arrow F2, primary gear wheel 10 will rotate in the direction of arrow F1, the condition of the gear wheels meshed with each other being illustrated in FIG. 2, with unit 32 which is in the illustrated position wherein last gear 16 rotates in the direction of arrow F2 and is in mesh with final gear wheel 12 which is thus driven in the direction of arrow F1, while gears 18 and 19 rotate idle.

It is evident that this condition will remain unchanged since drive gear wheel 11 and, accordingly, the motor member continue to rotate in such a direction as to result in the condition described above.

However, as soon as the motor member and accordingly drive gear wheel 10 reverse the direction of rotation thereof, there will be a reversal of the direction of rotation of gear wheel 10 which will now rotate in the direction of arrow F2 (FIGS. 3, 4 and 5) and, accordingly, also of last gears 16 and 18 and rear gear 19 that will now rotate in the direction of arrow F1.

Particularly, last gear 16 will start rotation in the direction of arrow F1 without transmitting its drive to final gear wheel 12, which is now blocked, in the direction of arrow F2 but rotating thereon, thus causing plate 15 to swing clockwise on shaft 14.

This happens because the final gear wheel in the blocked condition has a certain load, unit 32 is extremely light, since plate 15 is made from lightweight metal sheet and gears 16, 18 and 19 are made from plastics materials, and plate 15 can swing freely since blocking pin 31 is quite remote from arm 25 at this moment.

Clockwise rotation of plate 15 will cause gear 16 to be disengaged from the final gear wheel causing gear 18 to move towards final gear wheel 13 at the same time.

Figure 4:
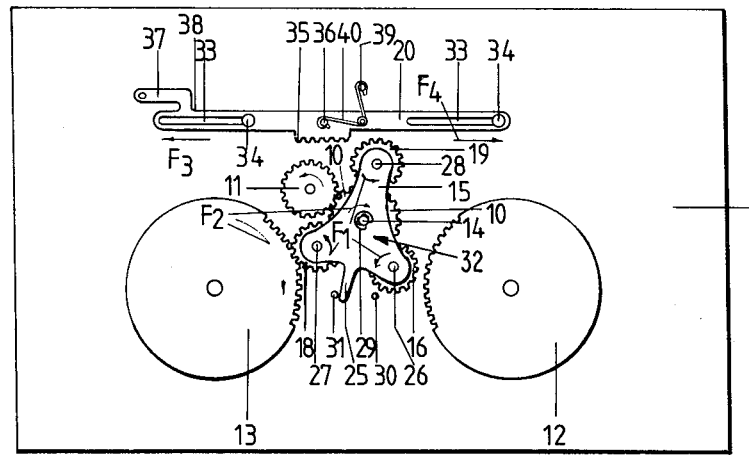
Figure 5:
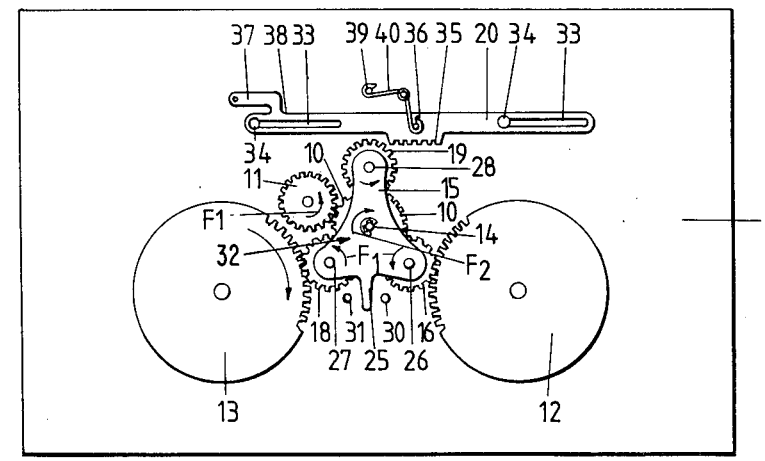

Since the diameters, teeth and arrangement of last gears 16 and 18 and final gear wheels 12 and 13 are such that as soon as gear 16 disengages from the teeth of final gear wheel 12 gear 18 meshes with the teeth of final gear wheel 13 and since the rotation of gear 18 in the direction of arrow F1 is such that the latter is caused to rotate on final gear wheel 13 in such a direction as to cause plate 15 to swing clockwise, the clockwise rotation of plate 15 will continue until arm 25 engages blocking pin 31, as sequentially illustrated in FIGS. 5 and 4. However, in the position of FIG. 4 gear 18 is completely in mesh with final gear wheel 13 and accordingly the latter is driven in the direction of arrow F2, this condition remaining stationary until primary gear wheel 10 rotates in the direction of arrow F2.

It should also be understood (FIG. 3) that at the end of the clockwise rotation of plate 15 rear gear 19 is in mesh with rack section 35 integrally formed with rod 20 and, since plate 15 is blocked by pin 31, the rotation of gear 18 in the direction of arrow F1 will cause rod 20 to be pulled to the left in the figure, as indicated by arrow F3. Snap-over spring 40 will initially oppose this movement thus loading and then unloading it will help the movement causing rod 20 to shift completely to the right into the position of FIG. 4 where rack section 35 is no longer in mesh with gear 19 which continues to rotate idle.

It will be evident that for reversing again the direction of rotation of primary gear wheel 10, that is causing gear wheel 10 to rotate in the direction of arrow F1, the above described operations will be inversely repeated so that plate 15 will swing counterclockwise disengaging gear 18 from final gear wheel 13 and causing gear 16 to be meshed again with final gear wheel 12, while rear gear 19 which is again in mesh with rack section 35 of rod 20 will shift rod 20 to the right in the direction of arrow F4, thus completely resuming the position shown in FIG. 2.

Rod 20 can be used to operate any desired member. In case the mechanism of the invention is applied to a cassette tape recorder the shift of member 20, for example, can be used to operate the relay switching the elastic connection to the various areas of the magnetic head of the recorder, necessary for the reverse operation thereof.

In connection with this application of the invention to cassette tape recorders, it will be readily understood by those skilled in the art that the invention provides an efficient mechanism for transmitting the drive of the motor of a recorder, in the desired direction, to either one of the drive shafts of the magnetic tape winding up reels depending on the either normal or reverse operation of the recorder.

I claim:

1. A driving mechanism for transmitting the rotative drive of a motor member, automatically changing the last gear thereof upon each reversal of the direction of rotation of said motor member, comprising: a drive gear wheel associated to said motor member; a first gear wheel utilizing the movement of said motor member or first final gear wheel, a second gear wheel utilizing the movement of said motor member or second final gear wheel; a bottom plate supporting said drive and final gear wheels; a primary gear wheel in mesh with said drive gear wheel and mounted on a shaft fixedly supported on said bottom plate; a swinging support fitted on said stationary shaft of said primary gear wheel so as to freely rotate in respect thereto; a first blocking pin adapted to engage said swinging support during the angular movement thereof in order to define a first angular position of said swinging support; a second blocking pin adapted to engage said swinging support during the angular movement thereof in order to define a second angular position of said swinging support; and, a first and a second last gears each pivotally mounted on a shaft supported by said swinging support so as to be meshed with said primary gear wheel, the parts described being so arranged that when said swinging support is in said first angular position, said first last gear is in mesh with said first final gear wheel and when said swinging support is in said second angular position, said second last gear is in mesh with said second final gear wheel and, furthermore, when said swinging support is in an intermediate position between said first and second angular positions, said first and second last gears abut the teeth of said first and second final gear wheels, respectively, without being meshed therewith, the angular movement of said swinging support from said intermediate position to either said first or said second angular position depending on the direction of rotation of said primary gear wheel.

2. The driving mechanism according to claim 1, comprising a third gear pivotally mounted on a shaft which is also supported by said swinging support so as to be meshed with said primary gear wheel at a remote location in respect of said two last gears, and a shifting member supported on said bottom plate so as to limitedly reciprocate in respect thereto from a first limit position to a second limit position, said shifting member comprising a central rack section adapted to mesh with said third gear and an elastic means of the bistable or snap-over type acting between said bottom plate and said shifting member to urge the latter either into said first or into said second limit position, the parts being so arranged that said third gear meshes with said rack section upon each shift of said swinging support from said first angular position to said second angular position, thus urging said shifting member towards the other of said limit positions, in cooperation with said bistable elastic means that initially opposes said movement thus loading and then unloading helps said movement.

3. The mechanism according to claim 1, wherein said elastic means comprises a bistable or snap-over spring having the ends thereof anchored to said bottom plate and said shifting member, respectively.

4. The mechanism according to claim 1, wherein said primary gear wheel is directly connected to said motor member.

5. The mechanism according to claim 1, applied to a magnetic tape recorder having first and second winding up reels wherein said first final gear wheel is the gear wheel of the recorder, said wheel having a shaft which drives the first winding up reel and said second final gear wheel is the gear wheel of the recorder, said wheel having a shaft which drives the second winding up reel.

6. The mechanism according to claims 2 and 5, wherein said shifting member controls a mechanical or electromechanical member of said recorder during its shift from said first limit position into said second limit position.

* * * * *